T. FAWCUS.
GEAR CUTTING MACHINE.
APPLICATION FILED APR. 29, 1911.
1,022,625.
Patented Apr. 9, 1912
3 SHEETS—SHEET 1.
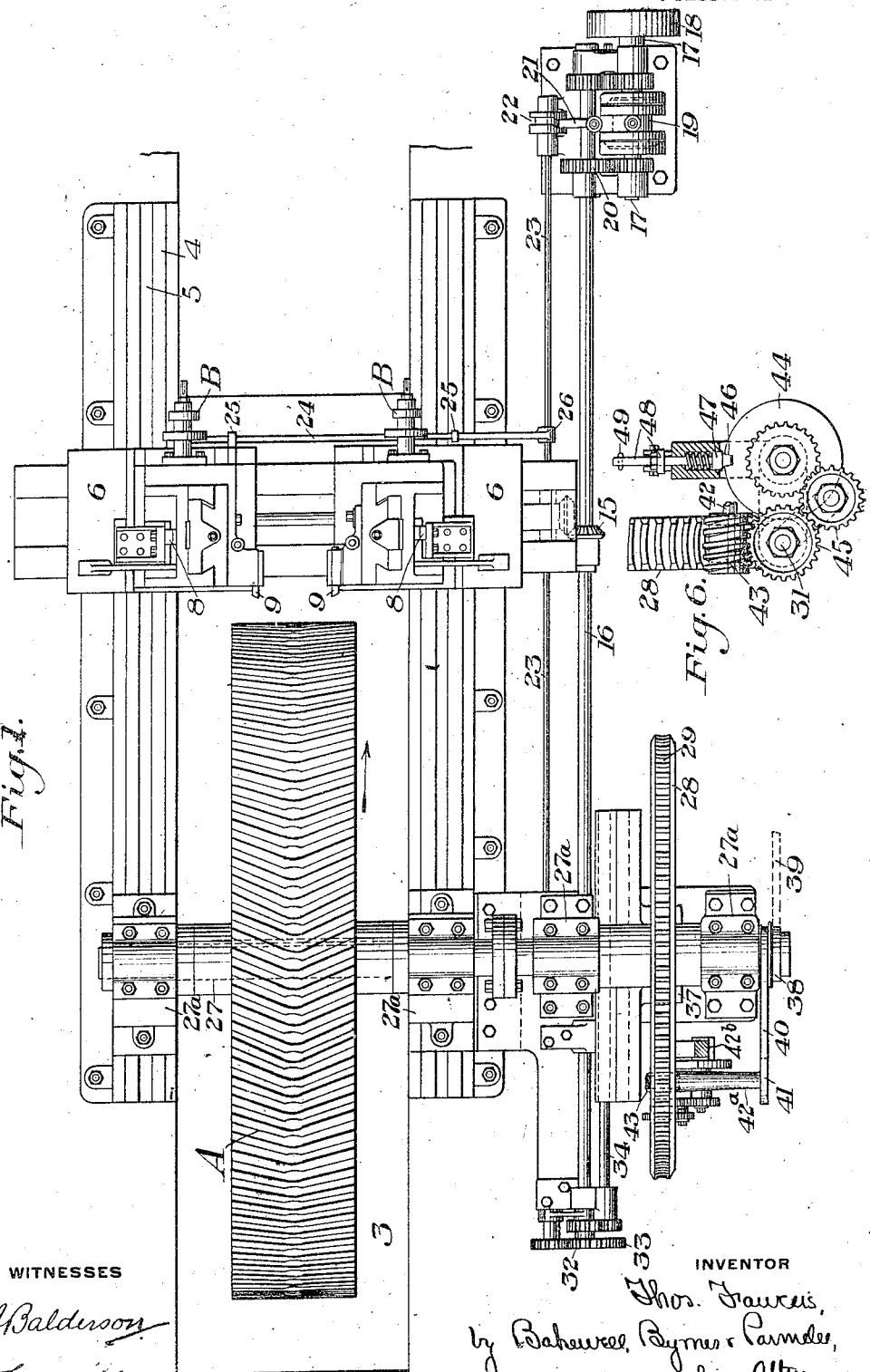
WITNESSES
INVENTOR T. FAWCUS.
GEAR CUTTING MACHINE.
APPLICATION FILED APR. 29, 1911.
1,022,625.
Patented Apr. 9, 1912.
3 SHEETS—SHEET 2.
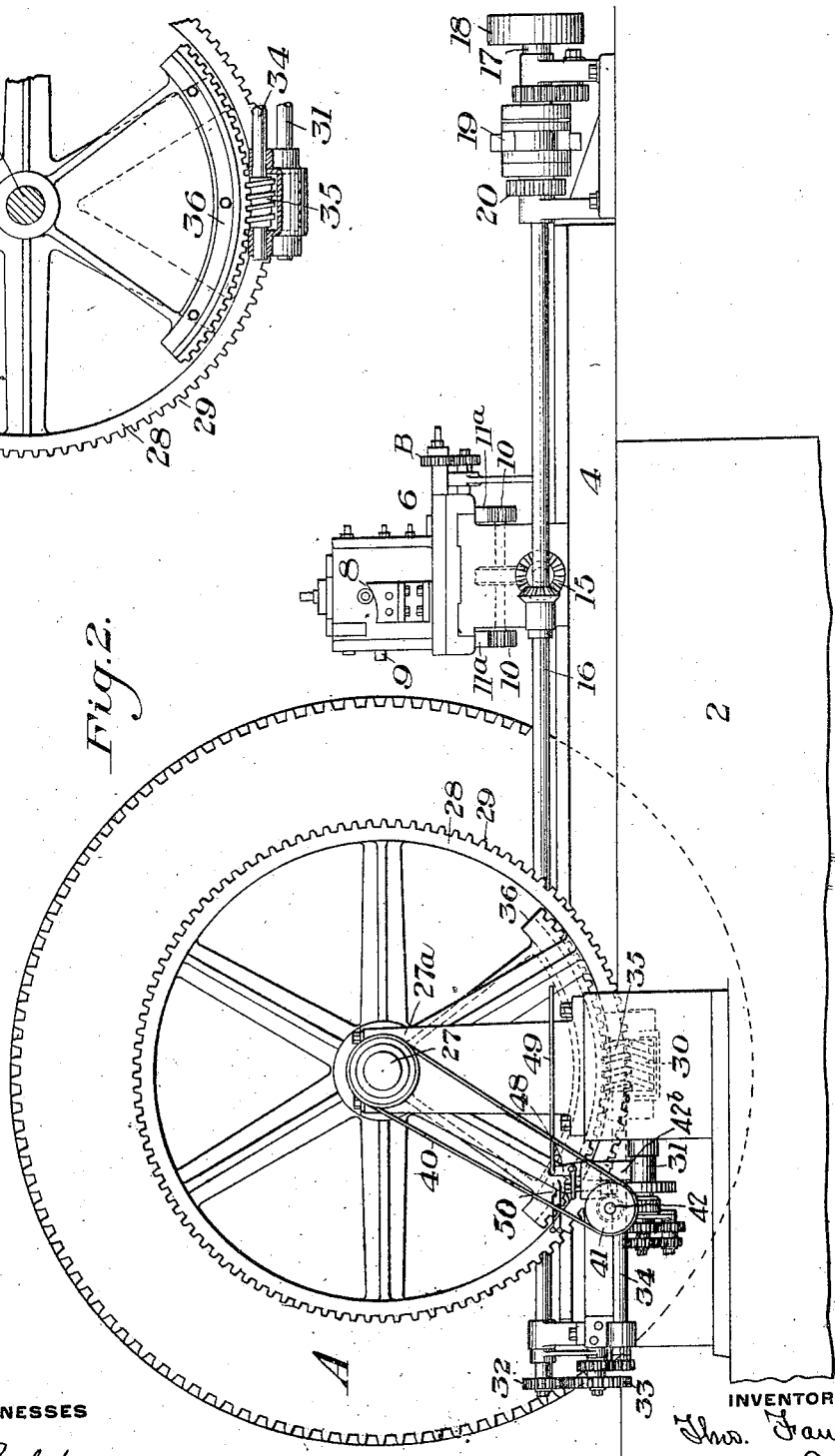
WITNESSES
INVENTOR

T. FAWCUS.
GEAR CUTTING MACHINE.
APPLICATION FILED APR. 29, 1911.

1,022,625.

Patented Apr. 9, 1912.

3 SHEETS—SHEET 3.

WITNESSES
R. A. Balderson.
W. Fawcus.

INVENTOR
Thos. Fawcus,
by Bakewell Byrnes Parmelee
his Attys.

UNITED STATES PATENT OFFICE.

THOMAS FAWCUS, OF PITTSBURGH, PENNSYLVANIA.

GEAR-CUTTING MACHINE.

1,022,625.

Specification of Letters Patent.

Patented Apr. 9, 1912.

Application filed April 29, 1911. Serial No. 624,156.

*To all whom it may concern:*

Be it known that I, THOMAS FAWCUS, of Pittsburgh, Allegheny county, Pennsylvania, have invented a new and useful Improvement in Gear-Cutting Machines, of which the following is a full, clear, and exact description, reference being had to the accompanying drawings, forming part of this specification, in which—

Figure 4:
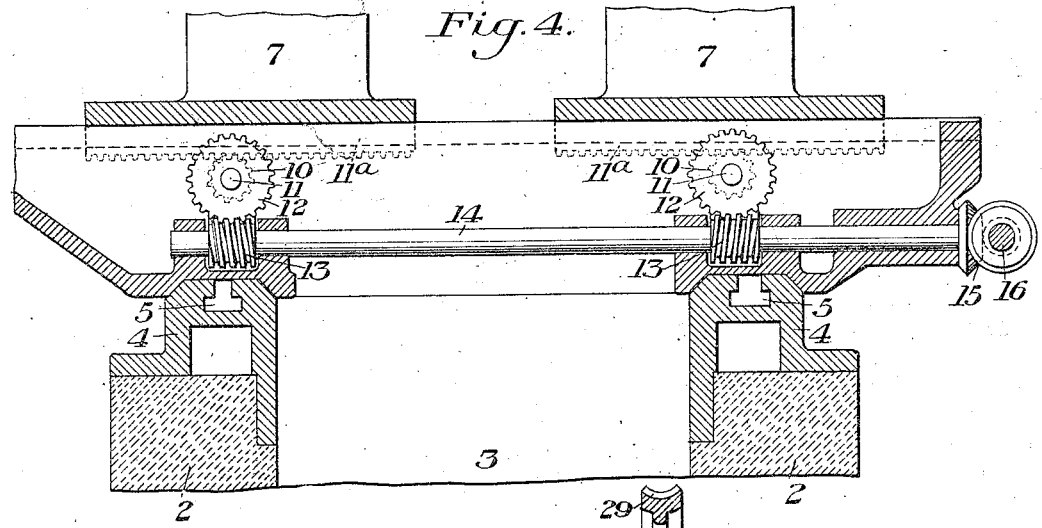
Figure 5:
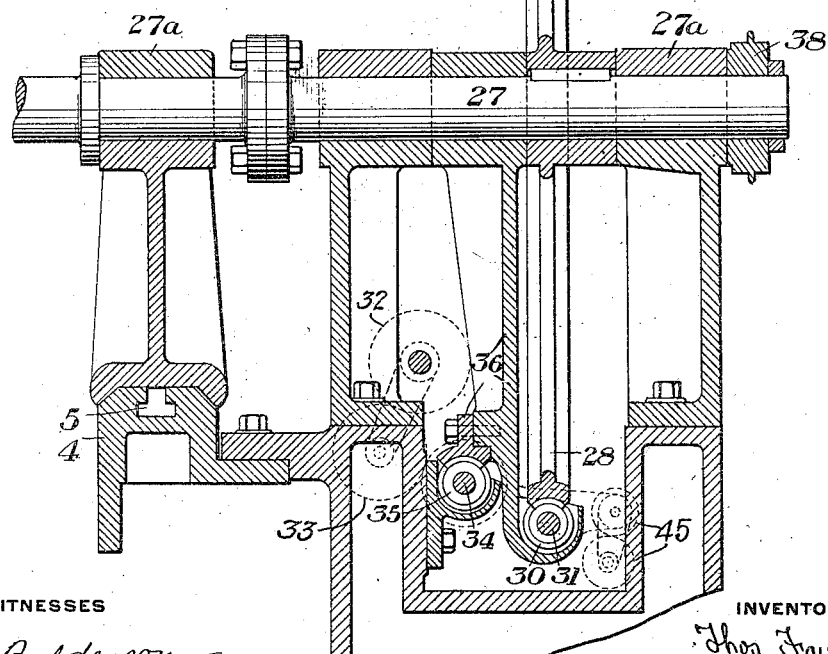

Figure 1 is a plan view of a machine embodying the preferred form of my invention; Fig. 2 is a side elevation of the same; Fig. 3 is a detail view of a portion of the gearing; Fig. 4 is a partial cross-section showing the gearing for feeding the tool slides; Fig. 5 is a sectional view showing the gearing for operating the index wheel and for moving the blank during the formation of a tooth; and Fig. 6 is a detail view of a portion of such gearing.

My invention has relation to gear cutting machines, and more particularly to a machine for cutting double helical gears of relatively large pitches and diameters; and is designed to provide a machine of this character by means of which gears of this class can be accurately cut with comparative rapidity.

Referring to the accompanying drawings, the numeral 2 designates the concrete base of the machine, which is preferably set over a pit 3, into which the blank to be cut can extend. Each side portion of the bed is provided with a rail 4 having a way 5 therein, in which a longitudinally movable tool slide 6 is mounted. The tool-slide is capable of being moved back and forth in these ways, and set at any desired position, in a manner well known in the art.

Mounted on the tool slide are two transversely movable tool carriers 7, each of which has a tooth former 8 and a cutter 9. The tool carriers and tooth formers are of any suitable character well known in the art, and form no part of my invention except in combination. The cutters 9 are preferably single-pointed or planer tools. They are arranged to be simultaneously moved toward or away from each other by means of the spur gears 10, which are mounted on the shafts 11 and engage with racks 11ª. Each of these shafts carries a worm wheel 12, which meshes with a worm 13 on the transverse shaft 14. The shaft 14 is connected by bevel gears 15 with a longitudinally extending shaft 16. The shaft 16 is driven from a shaft 17, which in turn may be driven in any suitable way as by means of a belt pulley 18. The shaft 17 is geared to the shaft 16 through the clutch 19, and reversing gears 20. The clutch is arranged to be shifted to drive the shaft 16 in either direction through a shifting member 21, which engages a cam 22 on rock shaft 23, which is placed parallel to the shaft 16.

24 is a transverse shipping rod having the adjustable collars 25, which are adapted to be engaged by the respective tool carriers. The shipping rod 24 is connected to a crank arm 26 on the rock shaft 23.

By means of the connection gearing described, the tool carriers are simultaneously moved toward or away from each other upon the tool slide, and at the proper time their movement is automatically reversed.

27 designates the shaft or mandrel, which is mounted in suitable bearings 27ª of the frame, and upon which is mounted the blank A in which the teeth are to be formed. The shaft 27 carries an index wheel 28 having worm teeth 29 in its periphery engaged by worm 30 on the shaft 31, the shaft 31 being driven in the manner hereinafter described.

The shaft 16 at the opposite end from where it is driven carries a spur gear 32, which, through a set of change gears 33, is arranged to drive a shaft 34. The shaft 34 carries a worm 35, which meshes with the teeth of a swinging worm segment 36, which is loosely mounted on the shaft or arbor 27 adjacent to the index wheel 28. The shaft 31 before referred to is journaled in bearings 37, which are carried by this swinging segment. The shaft or arbor 27 has loosely mounted thereon a double face belt pulley 38, which is arranged to be driven by a belt 39 (shown in dotted lines in Fig. 1), and which is connected by driving belt 40 with a pulley 41 on a shaft 42 carrying a worm 43 (as best shown in Fig. 6). The shaft 42 has its bearing in a sleeve 42ª, supported on the bracket 42ᵇ (see Fig. 1). The worm 43 meshes with a worm wheel on the shaft 31, and this shaft in turn drives a stop plate 44 through the change gears 45. The stop plate is provided with a single peripheral notch or recess 46, which is adapted to be engaged by a spring-pressed dog 47. The dog 47 is arranged to be lifted out of engagement with the recess of the stop plate by means of a bell crank 48 (see Figs. 2 and 6), which has an operating connection 49. Preferably, the movement of the bell crank lever to withdraw the dog from the notch of the stop plate also acts to close a pair of contacts 50 (see Fig. 2), which control the circuit of the motor which drives the belt 39.

The operation is as follows:—The blank A having been properly mounted upon or secured to the shaft or arbor 27, and the tool slide and tool carriers having been adjusted so as to bring the tools into proper position, the machine is started and the two tools 9 advanced toward the center of the face of the gear blank, the latter simultaneously rotating toward the tools until they reach the center when the tool carriers actuate the shipping rod 24 causing the clutch 19 to throw the reversing gears into operation. The shaft 16 is thus caused to reverse, thereby reversing the movement of the tool carriers and the blank. When the tool carriers return to their initial position the operation is repeated, a feeding movement of the tools being obtained through the gears B, or in any other suitable manner, over the former 8 and another cut is made. This cutting process is repeated and continues (the tools meanwhile advancing into the gear blank) until the full depth of the tooth is reached. The tools are then withdrawn from the cut by the operator, and another tooth face is brought into position. The cutting operations are repeated until the circuit of the entire blank has been made. The opposite faces of the teeth are then planed in a similar manner. In order to obtain the proper angularity of these teeth, it is evident that the blank must be rotated during the cutting operation, as above described, in the direction of the arrow on Fig. 1, since if the blank were not so rotated, the formed teeth instead of having the required angularity would extend straight across the periphery of the blank. It is for this purpose that the swinging segment 36 is provided. The rotation of the shaft 16 through the change gears 33 rotates the shaft 34, carrying the worm 35 which meshes with the worm teeth on the segment. It will, therefore, be apparent that the worm segment will be swung on the shaft or arbor 37; and through the worm 30, the segment becomes locked to the index wheel 28, which is fast to said shaft. Therefore, the shaft 27 will be rotated through an arc proportional to the arc of movement of the segment. When the direction of rotation of the shaft 16 is reversed at the completion of each tooth forming operation, the segment and blank are moved back to their previous initial positions. When the full depth has been reached by successive operations of this character, the operator actuates the connection 49 to withdraw the dog 46 from the notch of the stop plate; and by this movement of the bell crank 48, the motor circuit is closed at 50, and the pulley 38 is revolved, thereby causing the rotation of the shaft 31 and the proper movement of the index wheel. The stop plate is also rotated through the change gearing 45, and as soon as the notch or recess comes opposite the dog the latter will be forced into engagement therewith, and the circuit of the motor will be broken at 50. This stop plate insures the proper step by step feeding movement of the blank for the spacing of the successive teeth.

The change gears 33 provide means for varying the rotative movement of the blank so as to secure the required angularity of the teeth; and the change gears at 45 provide means for varying the spacing and number of teeth.

In the case of large gear wheels, the teeth are preferably roughly cast on the blank A, and are finished by the cutting operations described. Proper clearance may be provided at the central portion of the blanks by a previous cutting operation, in any well known manner, such as a peripheral groove; or by casting clearance spaces as shown on blank A, Fig. 1, thereby leaving a connection between the two parts of the tooth similar to that described in my Patent No. 980,232, granted January 3rd, 1911.

The advantages of my invention result from the provision of a machine of simple character by means of which the two parts of the double helical teeth may be simultaneously cut in a singe casting or blank at any desired angle with relative rapidity and with great accuracy.

By the use of single pointed tools, similar to planer or shaper tools, a minimum amount of clearance space is required as compared with that needed for milling tools. This is a very valuable advantage in gears of large pitch. The use of tools of this character also greatly reduces the cost of the operation, since the initial cost of these tools is relatively small and in case of any injury thereto they can readily be repaired or replaced.

It will be obvious that various changes may be made in the details of construction and arrangement of the parts without departing from the spirit and scope of my invention as defined in the appended claims. Thus, the tool slides, tool carriers, and tooth-forming means may be of any well known or suitable character; the manner of driving the several parts together with the details of the gearing may be varied, and various other changes may be made. By throwing the swinging segment 36 out of action, the machine may be used for cutting spur gears, if desired. Instead of a segment, it is obvious that a complete worm wheel may be used which, while not necessary for the particular function of the segment, may be used with advantage to revolve the gear blank for testing or other purposes.

What I claim is:—

1. In a machine for cutting double helical gears, the combination of a rotary blank carrier, means for imparting a step by step indexing movement thereto between the successive cutting operations, means for imparting a rotary movement to the blank during the cutting, and cutting tools arranged to simultaneously cut from opposite sides of the blank toward the center thereof; substantially as described.

2. In a gear cutting machine, the combination with a rotary blank carrier and an index gearing for imparting successive step by step movements thereto, of two cutting tools arranged to cut from opposite sides of the blank toward the center thereof, and other gearing for rotating the blank during the cutting operations; substantially as described.

3. In a gear cutting machine, the combination with a blank supporting shaft or arbor and index gearing and stop mechanism for imparting a step by step movement to the shaft or arbor between successive cutting operations, of two cutting tools arranged to cut from opposite sides of the blank toward the center thereof, and other gearing arranged to effect a rotary movement of the carrier during the cutting operations; substantially as described.

4. In a gear cutting machine, the combination with a rotary blank supporting shaft or arbor, and gearing for imparting a step by step indexing movement thereto, said gearing including an index wheel, of a movable gear member loosely mounted on said carrier, gearing for actuating said gear member during each tooth-forming operation, and means for causing the movement of the gear member to impart a corresponding movement to the blank carrier and blank; substantially as described.

5. In a gear cutting machine, the combination with a rotary blank supporting shaft or arbor, and means for imparting a step by step indexing movement thereto intermediate the tooth-forming operations, of an index wheel secured to said shaft and having worm teeth, a swinging gear member loosely mounted on the shaft, a worm carried by said gear member and meshing with the worm wheel, and gearing for actuating the gear member during each tooth-forming operation; substantially as described.

6. In a gear cutting machine, the combination with a rotary blank supporting shaft or arbor, of an index wheel secured to said shaft and having worm teeth, a swinging gear member loosely mounted on the shaft, a worm carried by said gear member and meshing with the worm wheel, and gearing for actuating the gear member during each tooth-forming operation, together with means whereby the extent of movement of the gear member may be changed; substantially as described.

7. In a gear cutting machine, the combination with a rotary blank supporting shaft or arbor, means for imparting a step by step indexing movement thereto, two single-pointed cutting tools, means for simultaneously actuating said tools, to cause them to make cuts from opposite edges of the blank, a former for guiding each tool to produce the tooth curve and other gearing for imparting a rotary movement to the blank during the cutting operations of said tools; substantially as described.

8. In a gear cutting machine, a rotary blank carrier, a pair of cutting tools arranged to cut from opposite edges of the blank toward the center, both tools acting upon the blank at the same side of its axis of rotation, and means for imparting a rotary movement to the blank during the cutting operation of the tools; substantially as described.

9. In a machine for cutting helical gears, the combination of a rotary blank carrier, means for imparting a step-by-step indexing movement thereto between the successive cutting operations, and cutting tools arranged to cut from opposite sides of the blank toward the center thereof, said tools being all at the same side of the axis of rotation of the blank, substantially as described.

10. In a machine for cutting helical gears, the combination of a rotary blank carrier, means for imparting a step-by-step indexing movement thereto between the successive cutting operations, and cutting tools arranged to cut from opposite sides of the blank toward the center thereof, all of said tools being arranged to operate upon different portions of the same tooth, substantially as described.

11. In a machine for cutting double helical gears, the combination of a rotary blank carrier, means for imparting a step-by-step indexing movement thereto between the successive cutting operations, means for imparting a rotary movement to the blank during the cutting, a single tool slide, a pair of tool carriers mounted thereon, a single pointed cutting tool mounted on each carrier, means for actuating the tool carriers, and formers for guiding tools to produce the tooth curves, substantially as described.

12. In a machine for cutting gears, the combination of a rotary blank carrier, means for imparting a step-by-step indexing movement thereto between the successive cutting operations, a single tool slide, a pair of tool carriers mounted on said slide and reciprocable in a direction parallel to the axis of the blank, means for actuating the carriers, and a cutting tool mounted on each carrier, said tools being arranged to cut from opposite sides of the blank, substantially as described.

13. In a machine for cutting double helical gears, the combination of a rotary blank carrier, means for imparting a step-by-step indexing movement thereto between the successive cutting operations, means for imparting a rotary movement to the blank during the cutting, a single tool slide movable toward and away from the blank, two transversely reciprocating carriers mounted on the slide, means for simultaneously actuating said carriers, and a single pointed cutting tool mounted on each carrier, said cutting tools being arranged to simultaneously cut from opposite sides of the blank toward the center thereof, substantially as described.

In testimony whereof, I have hereunto set my hand.

THOS. FAWCUS.

Witnesses:
A. F. COOKE,
C. E. MCAULEY.